(12) United States Patent
Chen et al.

(10) Patent No.: US 6,934,867 B2
(45) Date of Patent: *Aug. 23, 2005

(54) DIGITAL SYSTEM HAVING A MULTIPLICITY OF SELF-CALIBRATING INTERFACES

(75) Inventors: Jonathan Y. Chen, Yorktown Heights, NY (US); Patrick J. Meaney, Poughkeepsie, NY (US); William J. Scarpero, Jr., Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 586 days.

This patent is subject to a terminal disclaimer.

(21) Appl. No.: 10/150,231

(22) Filed: May 17, 2002

(65) Prior Publication Data

US 2003/0217302 A1 Nov. 20, 2003

(51) Int. Cl.[7] .............................................. G06F 1/04
(52) U.S. Cl. ...................................... 713/401; 713/503
(58) Field of Search ................................ 713/400–500, 713/503, 600

(56) References Cited

U.S. PATENT DOCUMENTS

| | | | | |
|---|---|---|---|---|
| 5,838,936 A | * | 11/1998 | Chau et al. ................... | 713/600 |
| 5,968,180 A | * | 10/1999 | Baco ............................ | 713/400 |
| 6,334,163 B1 | * | 12/2001 | Dreps et al. ................. | 710/260 |
| 6,654,897 B1 | * | 11/2003 | Dreps et al. ................. | 713/401 |
| 6,766,464 B2 | * | 7/2004 | Collier ........................ | 713/503 |
| 2003/0188046 A1 | * | 10/2003 | Chen et al. ................... | 710/1 |

* cited by examiner

Primary Examiner—Dennis M. Butler
(74) Attorney, Agent, or Firm—Lynn L. Augspurger

(57) ABSTRACT

A method of calibrating an interface is provided to automatically achieve a minimal cycle latency while maintaining synchronous data arrival between a multiplicity of self-aligning interfaces. Independent self-alignment interfaces may de-skew data bits and have them arrive on a minimum cycle boundary. However, if all the interfaces do not arrive on the same cycle, SMP designs may not function properly. For instance, with a single control chip and multiple data chips on an AMP node, the control chip often sends out controls to the dataflow chips. If the data arriving on the elastic interfaces is not synchronized with the controls, the data is not routed properly. The method employs a calibration pattern to determine the latest cycle that data is received across the elastic interfaces and calculates the target cycle for all the interfaces to match this latest cycle. The target cycle is fed back into the design and the data is received synchronously, also provided is a test to ensure that the data arrives synchronously.

15 Claims, 7 Drawing Sheets

Elastic Interface with Learned Target Cycle

DIGITAL SYSTEM HAVING A MULTIPLICITY OF SELF-CALIBRATING INTERFACES

RELATED APPLICATIONS

This application can be used with the synchronous interface described in IBM's co-pending U.S. patent application "Receiver Delay Detection And Latency Minimization For A Source Synchronous Wave Pipe-lined Interface", U.S. Ser. No. 10/096382, filed Mar. 12, 2002, the priority of which is hereby claimed. This co-pending application and the present application are owned by one and the same assignee, International Business Machines Corporation of Armonk, N.Y.

The descriptions set forth in the co-pending application are hereby incorporated into the present application by this reference.

FIELD OF THE INVENTION

This invention relates to computers and other digital systems, and particularly to an apparatus and method for automatically synchronizing multiple data buses into the same cycle in a digital system having a multiplicity of self-calibrating interfaces.

TRADEMARKS: S/390 and IBM are registered trademarks of International Business Machines Corporation, Armonk, N.Y., U.S.A. Other names may be registered trademarks or product names of International Business Machines Corporation or other companies.

BACKGROUND

Described is a method for a digital system having a multiplicity of self-calibrating interfaces for synchronizing multiple elastic interface buses into the same target cycle, particularly for an SMP environment, which allowing the multiple elastic interface buses to take advantage of minimized latency in the cases where their data all arrive early and also described is an apparatus for implementing the method. To achieve this, the invention includes the steps of:

sending a synchronization pattern through each of the multiple buses of the elastic interface;

determining a target cycle for the elastic bus having the latest arriving elastic interface data arrival; and applying this target cycle to all the interfaces.

This allows the use of automatic alignment elastic interfaces with automatic receiver target cycle calculation and minimized latency, providing the ability to calibrate for wide range of voltages, temperature, and cycle times while also supporting synchronous interfaces.

In particular, the described digital system method for a multiplicity of self-calibrating interfaces synchronizes all the received data, even if portions of the synchronous data were sent over different elastic interface buses and arrive with different cycle latencies.

Disclosed is also a method for determining the latest arriving elastic interface data signal as well as a method for calculating the corresponding target cycle parameter to allow for ALL the interfaces to align their data to this latest arriving interface data signal, while still maintaining the earliest arrival cycle for the complete data to minimize system latency.

Finally, a method is described to test the resulting interface to ensure that the interface is aligned properly.

The receiver interfaces may be elastic interfaces or not. The multiplicity of elastic interface receivers may be on the same chip or on multiple chips. The arbitration logic may be on one chip or across multiple chips as well.

These and other improvements are set forth in the following detailed description. For a better understanding of the invention with advantages and features, refer to the description and to the drawings.

DESCRIPTION OF THE DRAWINGS

FIG. 1 illustrates an elastic interface with learned target cycle time in accordance with IBM's method for minimizing latency in an elastic interface using a target cycle learning technique; while FIG. 2 illustrates the preferred embodiment with a multiplicity of elastic interfaces with learned target cycle time with sample receive data coupled to a target cycle synchronizer and verifier for synchronizing the multiplicity of receive data buses; while FIG. 3 illustrates a timing diagram showing the effect of the target cycle synchronizer and verifier; while

Our detailed description explains the preferred embodiments of our invention, together with advantages and features, by way of example, with reference to the drawings.

DETAILED DESCRIPTION OF THE INVENTION

Figure 1:
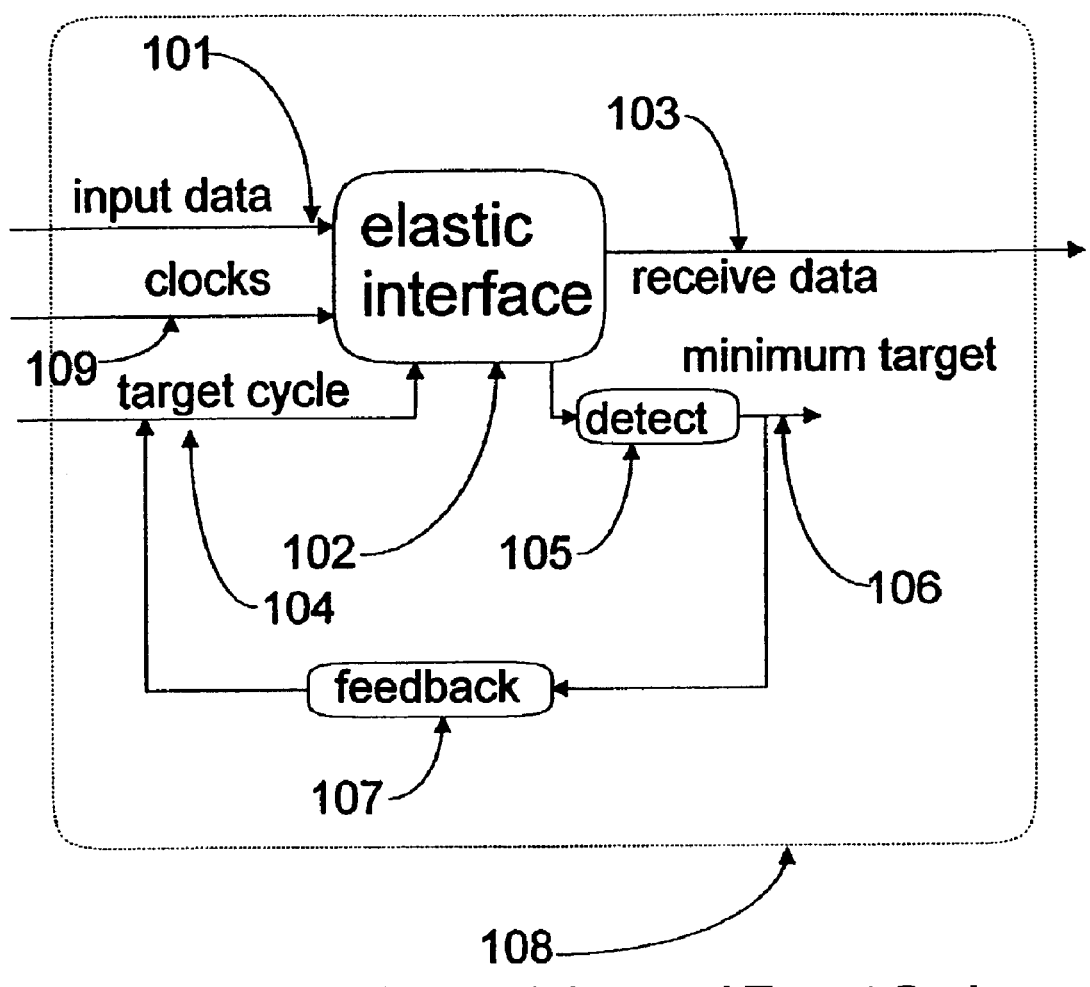

Turning to FIG. 1, notice the elastic interface with learned target cycle, 108, for minimizing the latency in an elastic interface using a target cycle learning technique consisting of an elastic interface, 102, which utilizes clocks, 109, and a target cycle bus, 104, which is initialized to a fixed value, to align input data bus, 101, to achieve an aligned receive data bus 103. Such alignment consists of locating a valid window for clocking the said input data, de-skewing input data, relocating a valid window for clocking, and supplying the aligned receive data at its output.

In addition, FIG. 1 shows that the elastic interface with learned target cycle, 108, further comprises a modification of an elastic interface as described in the related patent application "Receiver Delay Detection and Latency Minimization for a Source Synchronous Wave Pipelined Interface" referenced above using a target cycle learning technique, consisting of a detection circuit, 105, which calculates a minimum target cycle, 106, which includes additional margin or not. This minimum target cycle, 106, is fed back through feedback circuitry or programming, 107, onto input target cycle bus, 104, which is used to align the receive data bus, 103. FIG. 1 is considered background to the preferred embodiment as described herein and with respect to FIG. 2 describing the preferred embodiment for a multiplicity of elastic interface buses.

Figure 2:
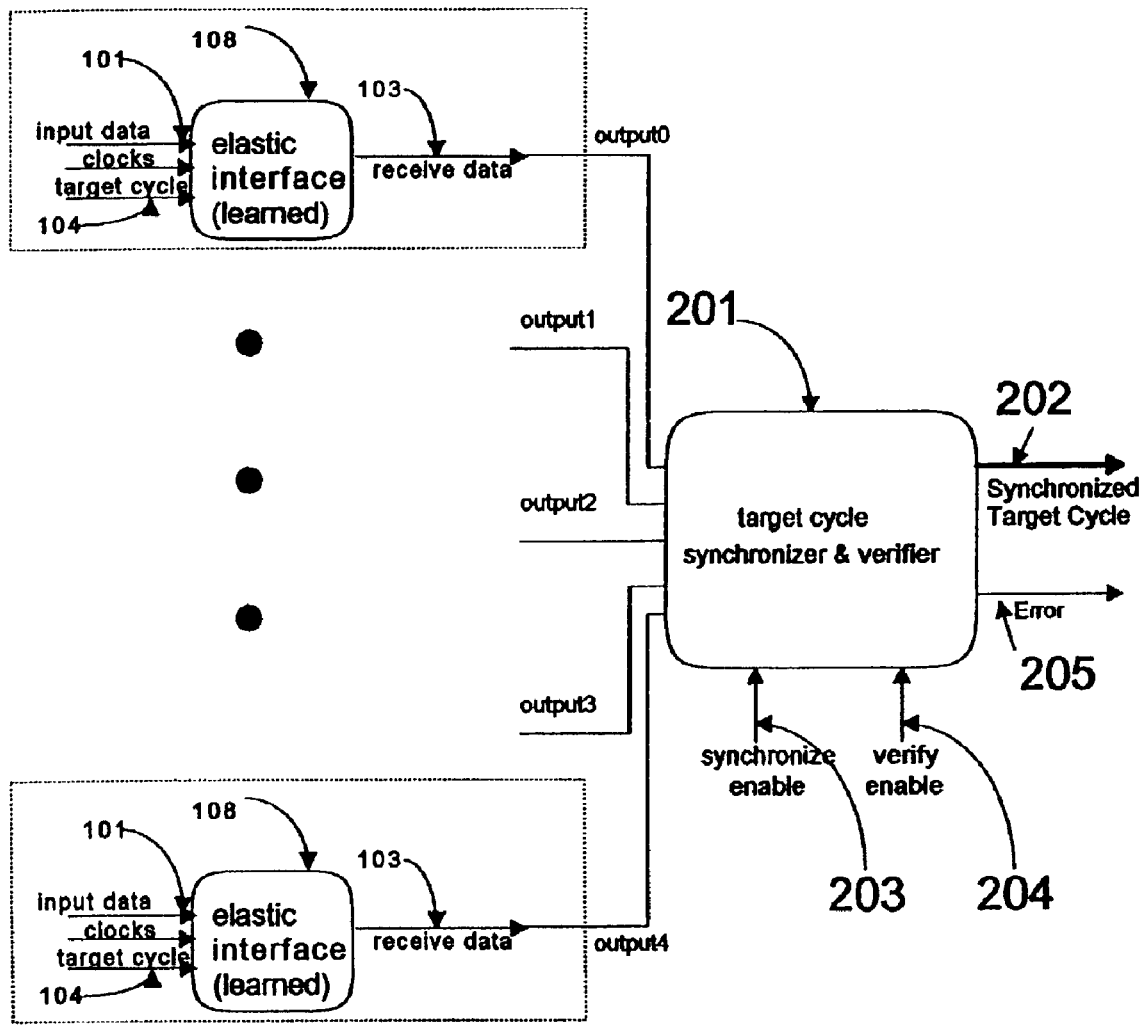

Turning to FIG. 2, and the SMP digital system having a multiplicity of self-calibrating interfaces, notice that there is a multiplicity of learned elastic interfaces, 108, each with output data bus, 103, connected to target cycle synchronizer and verifier, 201, which is used to calculate a synchronized target cycle, 202, when the synchronize enable input, 203, is active.

Upon completion of the calculation, the synchronize enable input, 203, is disabled while the synchronized target cycle, 202, is coupled back to the target cycle bus, 104, of the learned elastic interface, 108, using common mux controls (not shown).

The verify enable input, 204, is then activated to enable the verifier logic, which checks to make sure all the receive data bus samples, 103, are synchronized (i.e. all switching to the same data on the same cycles). If all the receive data bus samples, 103, are not equivalent for any cycle the verify enable signal, 204, is active, the output error signal, 205, is made active and holds until the verify enable signal, 204, is activated again.

Figure 3:
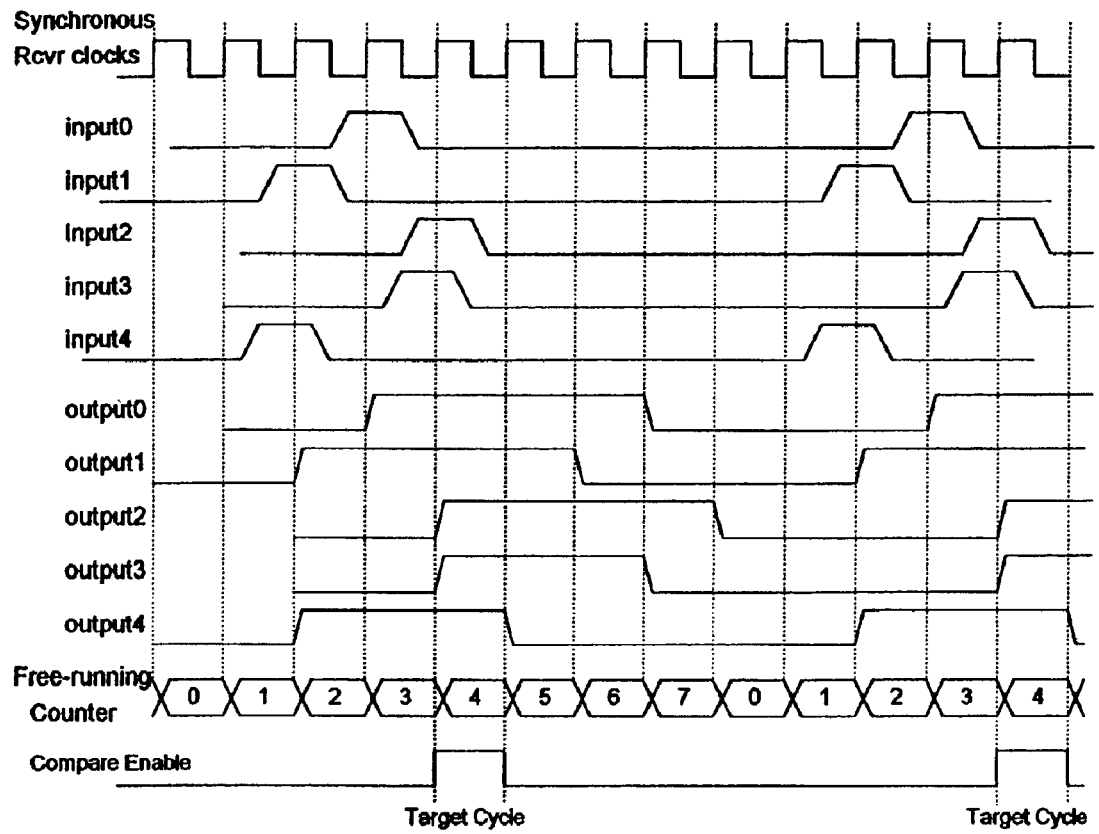

For a further understanding of the synchronizer operation, refer to FIG. 3. A sample bit from each of the multiplicity of input data bases, 101, is shown as input0 through input4. Notice that the input data buses each have a periodic pulse or signal that is up for one-cycle and down for 7. This is the synchronization pattern. The arrival times of these waveforms are dependent on different package latencies, and thus, are not all the same. In fact, they are data signals that may arrive on different system cycles.

A sample bit from each selected internal elastic interface register of the multiplicity of elastic interfaces is shown as output0 through output4. Notice that these sample bits come up after the next local clock and hold for at least three cycles (depending on elasticity of the interface and clock phase relationships).

Normally with an elastic interface, there are several holding registers (typically 4) which are located in periodic sequence with input data, 101, (see also FIG. 3). In addition, there is within the elastic interface 108's incorporated mux (not separately shown) which alternatively selects from these staging registers are to be used as the receive data bus, 103.

During the synchronization step, the preferred embodiment forces the elastic interface 108's mux to a fixed state, thereby coupling one of the holding registers to the receive data bus, 103. Then comparing the FIG. 2 input2 waveform with the output2 waveform as shown in FIG. 3, notice that the output2 waveform turns on beginning with the cycle after the input2 waveform reaches a value of '1'. The output2 waveform then indicates that the holding register has held for three cycles.

The preferred embodiment takes advantage of the fact that these registers hold for the elasticity number of cycles. Therefore, by using the invention, the first cycle the synchronized target cycle waveform is '1' is the synchronized target cycle, which periodically comes up based on the period of the synchronization pattern.

With other elastic interfaces, it is possible to allow the receive data bus, 103, to have the output muxing in normal system operation (i.e. not freezing the output mux to choose a particular staging register). By using the one-cycle pulses from each interface and using a register that holds for the elasticity number of cycles and then resets, the synchronizer can be used in the same manner as the preferred embodiment. There are similar equivalent techniques for obtaining the synchronized target cycle.

There exists a free-running counter which is phase-synchronized to the elastic interface sequence counters. When the synchronized target cycle occurs, the free-running counter indicates the correct synchronized target cycle parameter, 202.

Figure 4:
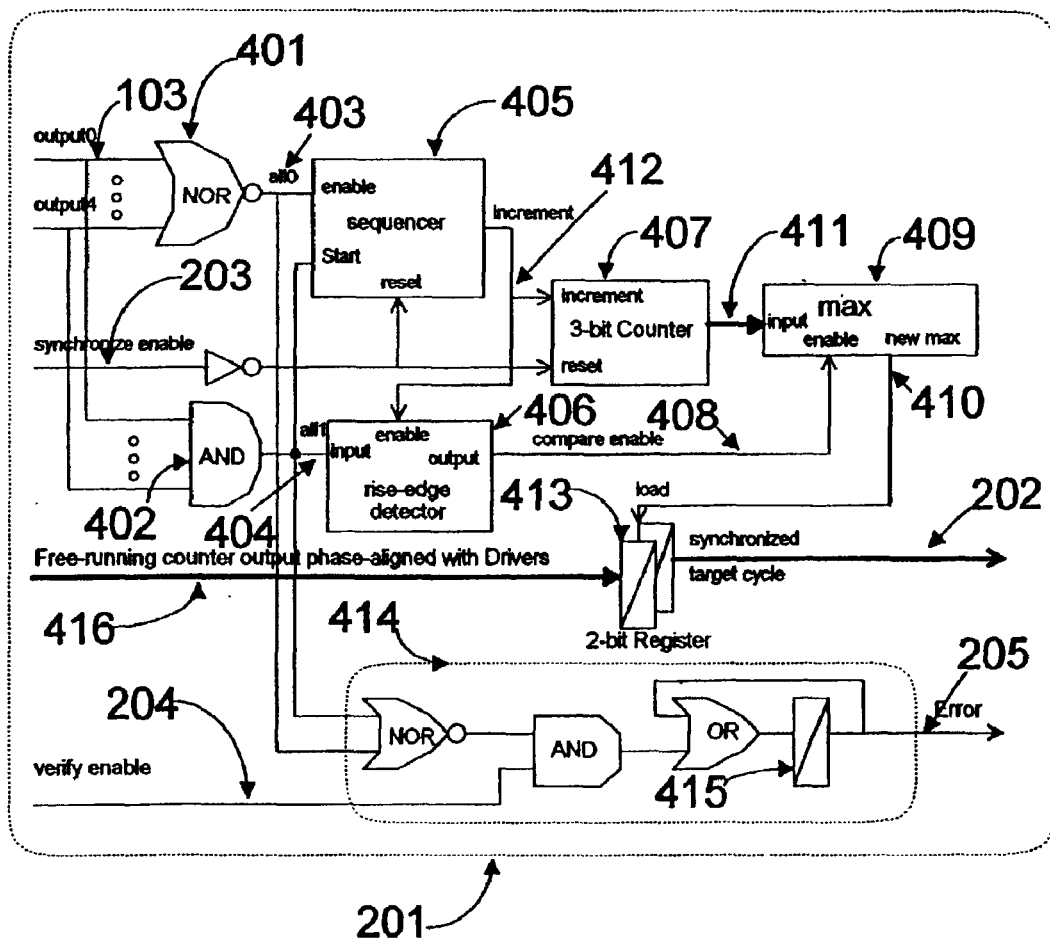
FIG. 4 illustrates a preferred exemplar apparatus for implementation of the method in an apparatus of the target cycle synchronizer and verifier circuit.

FIG. 4 shows a preferred embodiment of the target cycle synchronizer and verifier logic. Sample bits from each receive data bus, 103, connect to a NOR circuit, 401, to achieve an a110 (all zero) signal, 403, which is active when all sample bits are ZERO. Sample bits from each receive data bus, 103, connect to an AND circuit, 402, to achieve an a111 (all one) signal, 404, which is active when all sample bits are ONE.

The sequencer control logic, 405k, is responsible for starting the synchronizer function. It first monitors the a111 (all one) signal, 404, and then waits for the a110 (all zero) signal, 403, at which time it brings up and holds the increment output signal, 412, until the synchronize enable signal, 203, is dropped, causing the sequencer, 405, to reset itself and to drop the increment output signal, 412.

The increment signal, 412, is coupled to input enable of a rise-edge detector, 406, which monitors the a111 (all one) signal, 404, for a one-cycle leading edge. On the cycle the a111 (all one) signal, 404, rises, a one-cycle pulse is output on compare enable signal, 408. This pulse typically occurs approximately every eight cycles, when a111 (all one) signal, 404, goes from zero to one.

The increment signal, 412, is also coupled to input increment of a three-bit reference counter, 407, which continues to count from 0 to 7 continuously until the synchronize enable signal, 203, is dropped, which resets the three-bit counter. This also implies that the counter was at zero before the increment signal, 412, became active, since the synchronize enable signal, 203, was initially zero. The output of the three bit reference counter, 407, is available as count bus, 411, which is connected to a maximum count function, 409, which internally stores the maximum value of the count bus, 411, and the previously stored maximum value of the count bus, whenever the compare enable, 408, is active. Upon detection of a new maximum (i.e. count bus, 411, is greater than the previous counter value), a one-cycle pulse appears on the new max signal, 410, which forces two-bit synchronized target cycle register, 413, to capture the current free-running count bus, 416. Said synchronized target cycle register, 413, contents are supplied as output from the target cycle synchronizer and verifier, 201, onto synchronized target cycle bus, 202.

Also shown in FIG. 4 is the verifier circuit, 414, which, using simple circuits, detects to make sure that either the a110 (all zero) signal, 403, or the a111 (all ONE) signal, 404, are on at all times while verify enable, 204, is active. Otherwise, error latch, 415, is set and held, causing output error signal, 205, to become active. The interface is unusable if error signal, 205, is set. The error latch, 415, must be cleared before repeating the target cycle synchronization or verification procedures.

Figure 5:
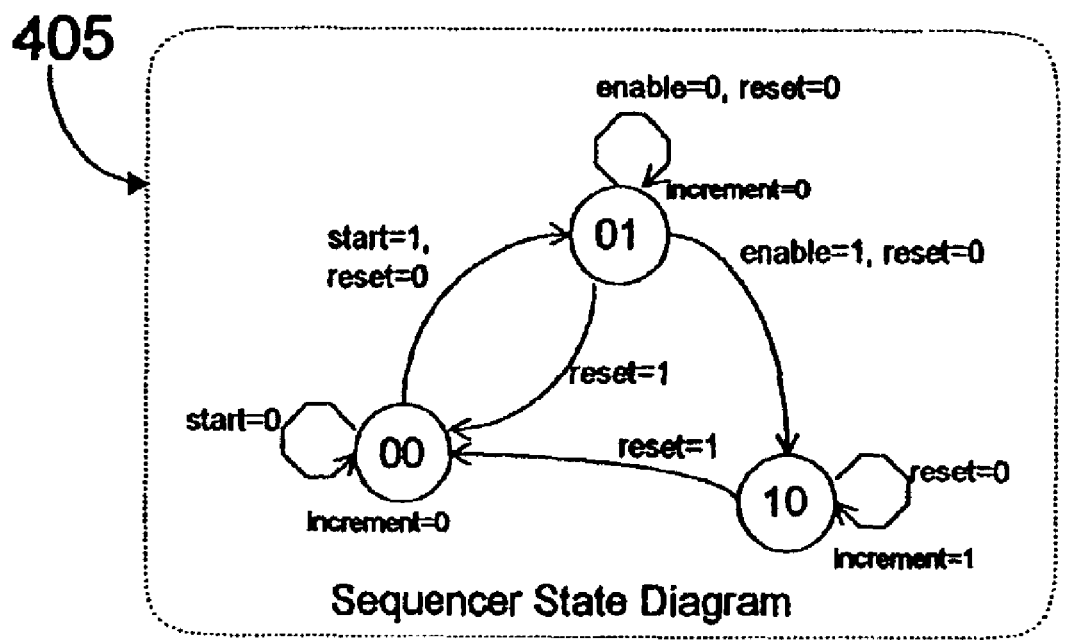
FIG. 5 illustrates a state diagram of sequencer control logic used in the target cycle synchronizer and verifier circuit.

Turning to FIG. 5, shown is a state diagram for the sequencer control logic, 405. State '00' is used to wait for the a111 (all ONE) signal, 404, to become active, at which time it proceeds to state '01'. State '01' is used to wait for the a110 (all zero) signal, 403, to become active, at which time it proceeds to state '10'. State '10' is used to hold the increment output signal, 412, which kicks off the counter and other sequence controls.

Figure 6:
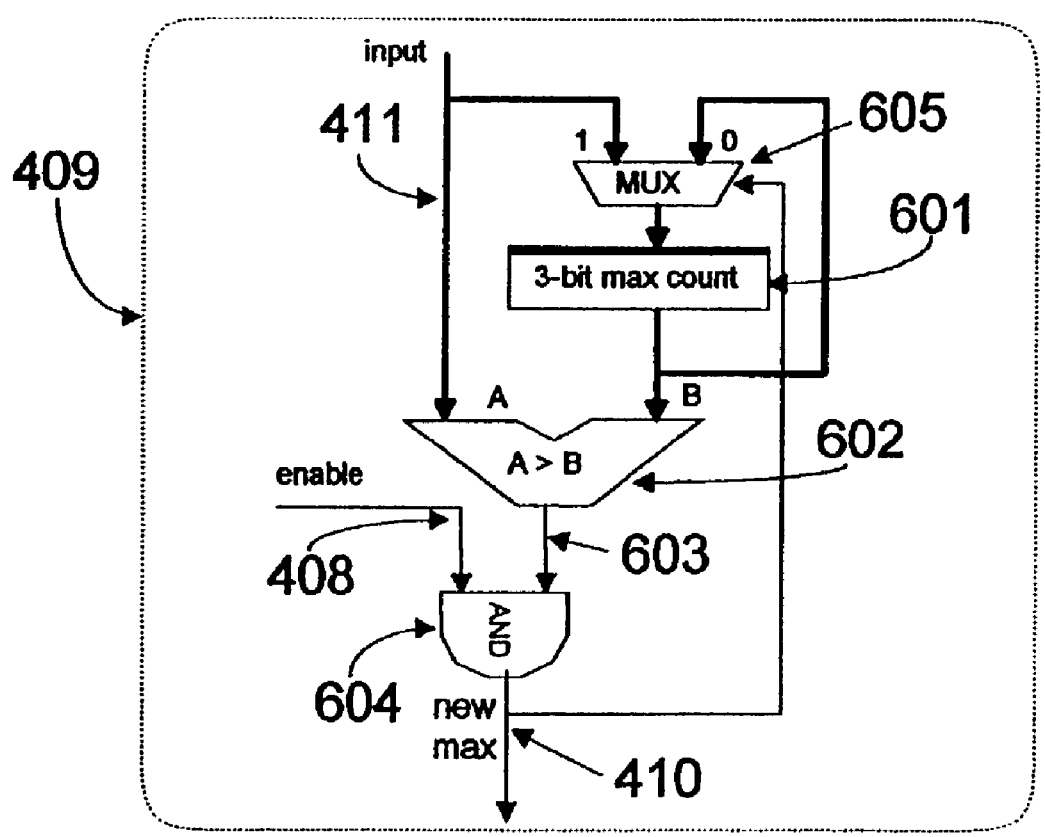
FIG. 6 illustrated an implementation of a maximum counter circuit used in the target cycle synchronizer and verifier circuit.

FIG. 6 shows an implementation of a maximum counter circuit, 409. Input counter value, 411, is compared to three-bit maximum count register, 601, with compare circuit, 602, to yield 'new count>old count' signal, 603, which is ANDed with compare enable, 408, using AND circuit, 604, whose output, new maximum signal, 410, indicates a new maximum is detected. The new maximum signal, 410, is used to update the three-bit maximum count, 601, using mux, 605.

Figure 7:
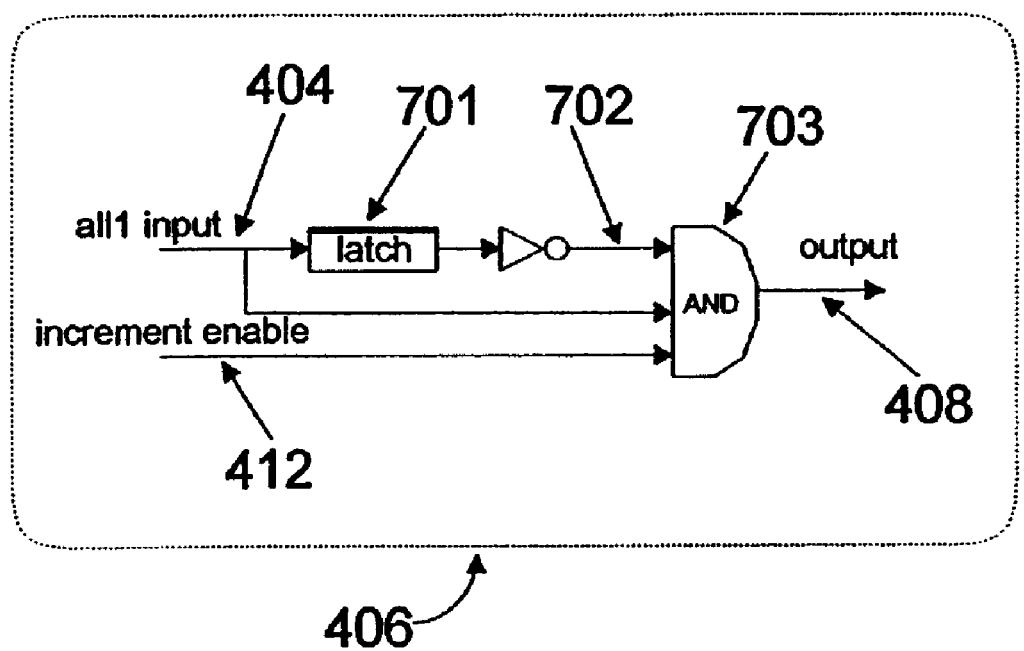
FIG. 7 illustrates an implementation of a rise-edge detector used in the target cycle synchronizer and verifier circuit.

FIG. 7 shows an implementation of a rise-edge detector circuit, 406, consisting of an input a111 (all ONE) signal, 404, which is captured in one-cycle latch, 701, each cycle. There is an AND circuit, 703, which is used to AND the a111 (all ONE) signal, 404, with the staged inverted a111 (inverted all ONE) signal, 702, with the increment enable signal, 412, to determine if a rising edge of the a111 (all ONE) signal, 404, has been detected any time after the sequencer, 405, has entered state '10'. The output of said AND circuit 703, is used to create the compare enable signal, 408, used by the maximum counter circuit, 409.

The steps which can be used for synchronizing the interface with another are summarized:

1. Send synchronization pattern from an elastic interface driver to an elastic interface receiver;
2. Set receiver selection mux to a fixed state to monitor one of the elastic interface receiver registers; and then
3. Wait for all monitored interface registers to be a value, e.g. '1';
4. Then, Wait for all monitored interface registers to be another value, e.g. '0'; and in the process,
5. A reference counter is enabled; such that
6. whenever all receive data firs goes to the first value '1' again, the reference counter value is recorded and compared to the maximum of any previously recorded reference counter values.
7. Each time a new maximum value is encountered (normally, the maximum does not change after the initial setting), record the free-running interface counter value into the synchronized target register; and
8. Switch a receiver selection mux to normal operation; and
9. Feedback any recorded synchronized target register value into all elastic interface receiver target cycle inputs; and then
10. Wait for stability.
11. When it is verified that all receiver data buses are identical during every cycle during a verification window; then
12. The synchronization pattern is turned off; and
13. The Elastic Interface is ready for use.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a digital system having a multiplicity of self-calibrating interfaces of an elastic interface, a method of synchronizing data comprising the steps of:
   (a) sending a synchronization pattern through each of a plurality multiple buses of the elastic interface;
   (b) determining a target cycle for an elastic bus having latest arriving data for said elastic interface; and
   (c) applying this target cycle to said self-calibrating interfaces, further comprising the steps of detecting the earliest received data and comparing received synchronization patterns of said received data, and
   (d) switching to disable a synchronize enable input while a synchronized target cycle is coupled back onto a target cycle bus of said elastic interface for synchronizing said multiplicity of self-calibrating interfaces.

2. The method of claim 1 further comprising the steps of detecting the earliest and latest received data and comparing received synchronization patterns of said received data to determine said target cycle.

3. The method of claim 1 further comprising the steps of detecting the earliest and latest received data and comparing received synchronization patterns of said received data and to determine a target cycle and calculating parameters for further received data which involves the step of selecting the pattern corresponding to the latest received data to determine said target cycle for the elastic bus having the latest arriving elastic interface data arrival.

4. The method of claim 1 further comprising the steps of:
   sending said synchronization pattern from an elastic interface driver to an elastic interface receiver having a multiplicity of interface receiver registers; and then
   waiting for all monitored interface registers to be a first value (e.g. '1'); and then
   waiting for all monitored interface registers to be another value, e.g. '0'; and in the process enabling a reference counter such that whenever all receive data first goes to the first value (e.g. '1') again, the reference counter value is recorded and compared to the maximum of any previously recorded reference counter values.

5. The method of claim 4, wherein:
   each time a new maximum value is encountered the free-running interface counter value is recorded into a synchronized target register.

6. The method of claim 5 wherein:
   when receiver selection is determined as a normal operation ay recorded synchronized target register value is fed back into all elastic interface receiver target cycle inputs.

7. The method of claim 5, wherein:
   when receiver selection is determined as a normal operation any recorded synchronized target register value is fed back into all elastic interface receiver target cycle inputs until stability occurs, during which time all receiver data buses are verified as identical during every cycle during a verification window; whereupon the synchronization pattern is turned off and this target cycle to all the interfaces and the elastic interface is ready for use.

8. In a digital system having a multiplicity of self-calibrating interfaces, a method of synchronizing data comprising the steps of:
   a) sending a synchronization pattern across each self-calibrating interface,
   b) determining a latest cycle that all the interfaces have correctly received data, wherein the method includes the additional step of:
   c) feeding back this latest arriving interface cycle so that all interfaces will achieve the same target, and
   d) switching to disable a synchronize enable input while a synchronized target cycle is coupled back onto a target cycle bus of said elastic interface for synchronizing said multiplicity of self-calibrating interfaces.

9. The method of claim 8 wherein said determining the latest cycle includes the steps of:
   b-1) switching elastic interface receivers to monitor one of a plurality elastic interface registers, detecting when all interfaces have received a '1',
   b-2) detecting when all interfaces have received a '1',
   b-3) detecting when all interfaces have returned to '0',
   b-4) enabling a reference counter,
   b-5) detecting when all the interfaces first go to '1' again, and recording the reference counter,
   b-6) whenever the reference counter reaches a new maximum, recording an interface free-running counter, b-7) switching the elastic interface receivers to monitor all the elastic interface registers under normal operation, b-8) feeding back the recorded interface free-running counter value as a new target cycle time for all the elastic interfaces.

10. The method of claim 8 wherein there is an additional step of:

d) verifying that all receiver data buses are identical every cycle during a verification window.

11. The method of claim 8 further comprising the steps of detecting the earliest and latest received data and comparing received synchronization patterns of said received data and to determine a target cycle and calculating parameters for further received data which involves the step of selecting the pattern corresponding to the latest received data to determine said target cycle for an elastic bus having the latest arriving elastic interface data arrival whereby all the interfaces to align their data to the latest arriving interface data signal while still maintaining an earliest arrival cycle for the complete data to minimize system latency.

12. The method of claim 8 further providing a test of the resulting interface to ensure that the interface is aligned properly.

13. A digital system elastic interface apparatus, comprising:

an elastic interface having a multiplicity of self-calibrating interfaces each with an output data bus coupled to a synchronization and verifier circuit for calculation of a synchronized minimum target cycle when a synchronized enable input is active, and a feedback circuit onto an input target cycle bus for aligning data of a receive data bus, and a switch upon completion of the calculation for disabling the synchronize enable input while the synchronized target cycle is coupled back onto a target cycle bus of said elastic interface.

14. The digital system elastic interface apparatus of claim 13 wherein is provided a verify enable input which is activated to enable verifier logic of said synchronization and verifier circuit, which checks to make sure all receive data bus samples of said elastic interface are synchronized and all switching to the same data on the same cycles.

15. The digital system elastic interface apparatus of claim 14 wherein if all said receive data bus samples, 103, are not equivalent for any cycle, a verify enable signal is enabled, then an output error signal is made active and holds until the verify enable signal is activated again.

* * * * *